United States Patent [19]

Schultz

[11] 4,155,623

[45] May 22, 1979

[54] INSTRUMENT FOCUS STOP

[75] Inventor: Richard P. Schultz, Williamsville, N.Y.

[73] Assignee: American Optical Corporation, Southbridge, Mass.

[21] Appl. No.: 896,669

[22] Filed: Apr. 17, 1978

[51] Int. Cl.² ............................................. G02B 21/26
[52] U.S. Cl. ......................................... 350/84; 74/526
[58] Field of Search ....................... 350/84, 86, 90, 44, 350/255; 74/526, 10.2, 414

[56] References Cited

U.S. PATENT DOCUMENTS

| 2,490,970 | 12/1949 | Krassilnikian et al. | 350/86 |
| 2,722,297 | 11/1955 | Gates, Jr. | 74/414 |
| 2,844,038 | 7/1958 | Danta | 74/526 |
| 3,150,259 | 9/1964 | Wilska | 350/86 |
| 3,662,610 | 5/1972 | Thoen | 74/10.2 |

Primary Examiner—Jon W. Henry
Attorney, Agent, or Firm—Jeremiah J. Duggan; Stephen A. Schneeberger; Alan H. Spencer

[57] ABSTRACT

A stop for an instrument focusing shaft wherewith the extent of its rotational excursion in one direction may be readily adjusted and repeated. A gear fixed to the focusing shaft and in mesh with additional gearing is selectively stopped by another gear caused to mesh across two gears of the system. The stop gear may be carried out of mesh by reverse rotation of the focusing shaft.

8 Claims, 3 Drawing Figures

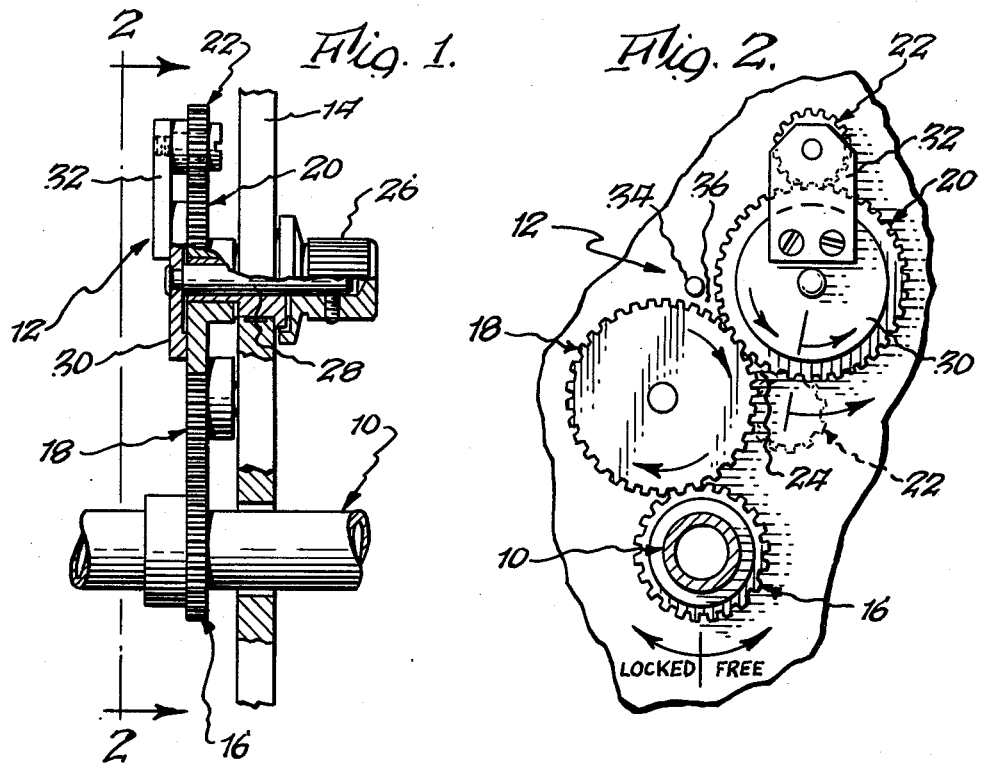
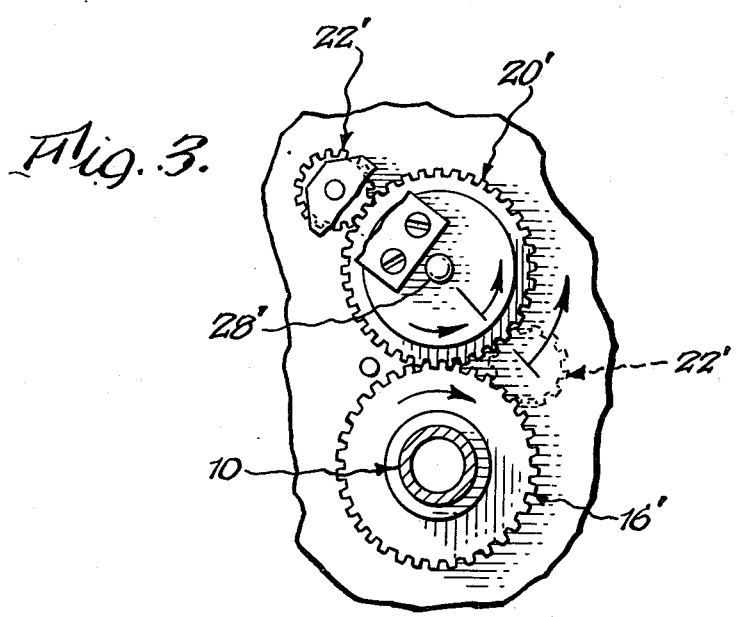

INSTRUMENT FOCUS STOP

BACKGROUND OF THE INVENTION

1. Field of the Invention

This invention relates to instrument focusing systems and has particular reference to improvements in stops for microscope coarse focusing mechanisms.

2. Description of the Prior Art

Stopping the coarse adjustment of a microscope objective at a preselected position along its excursion has been accomplished with a spring-loaded pin attached to one member of the system and adjusted by a screw or clamp to restrict the motion of another member. The high mechanical advantage of a microscope coarse focus, however, demands very tight clamping which puts excessive strain on the focusing mechanisms.

Other methods of using end stops on the coarse focusing shaft restrict its travel to less than 360° which unduly inhibit the focusing system.

It is, accordingly, an object of the invention to provide simple inexpensive and reliable stop means which overcomes the aforesaid problems and wherewith settings for stopping a coarse focusing shaft may be made with ease and simplicity.

Another object is to provide novel means for stopping one direction of turning of an instrument focusing shaft at a preselected point of rotational orientation while permitting free reverse turning and return with an assurance of accuracy in repetition of original alignment.

Another object is to accomplish the aforesaid reverse turning over greater than 360° from the preselected point of alignment and return thereto.

Other objects and advantages of the invention will become apparent from the following description.

SUMMARY OF THE INVENTION

The foregoing objects and their corollaries are accomplished by gearing applied directly to the coarse adjusting shaft of a microscope focusing system such as that of U.S. Pat. No. 3,768,885, for example.

A gear fixed to the coarse focusing shaft and in mesh with additional gearing is selectively stopped from one direction of rotation by an epicyclic stop gear caused to mesh across two gears of the system.

By reverse rotation of the focusing shaft, the stop gear is carried away from one of the two gears freeing the shaft for continued reverse rotation. Gear selections shown and described herein illustrate the enablement of stopping with assurance of accurate repetition at any selected part of greater than 360° focusing shaft rotation.

Details of the invention will become more readily apparent from the following description when taken in conjunction with the accompanying drawings.

IN THE DRAWINGS

FIG. 1 is a fragmentary partially cross-sectioned side view of an embodiment of the invention;

FIG. 2 is a view of the focusing stop taken approximately along line 2—2 of FIG. 1; and FIG. 3 is a view similar to FIG. 2 illustrating a modification of the invention.

DESCRIPTION OF THE PREFERRED EMBODIMENT

Referring more particularly to FIGS. 1 and 2, hollow shaft 10 represents the coarse adjustment shaft of an instrument focusing system such as that of U.S. Pat. No. 3,768,884, for example, wherein it is required to make coarse and fine adjustments of the position of an objective lens relative to a specimen position for examination. Having performed the necessary coarse and fine adjustments, i.e. to optimize viewing of the specimen, repeated studies of other identically spacially located specimens can be facilitated by affording stop means for automatically returning the focusing system to the first adjusted position with each change of specimen.

In the usual case of moving the instrument objective out of the way to change specimens, it is customary to use the coarse adjustment shaft which carries the fine adjustment mechanism along with it.

Accordingly, by returning the coarse adjustment shaft to precisely its first adjusted position with the fine adjustment mechanism remaining undisturbed, the new specimen may be immediately clearly observed without further tedious and time consuming focusing operations.

This is accomplished according to the invention with planetary gear train 12 (FIGS. 1 and 2) supported by instrument plate 14.

Gear train 12 includes drive gear 16 fixed to shaft 10, idler gear 18, carrier gear 20 and epicyclic stop gear 22.

With stop gear 22 in the illustrated full-line position (FIG. 2), rotation of shaft 10 causes gear 20 to carry stop gear 22 toward or away from space 24 formed between gears 18 and 20. When stop gear 22 is brought into space 24 as shown by broken line illustration, and into mesh with gears 18 and 20, by clockwise rotation of shaft 10 as viewed in FIG. 2 the resulting bridging of space 24 with stop gear 22 locks shaft 10 against further clockwise rotation.

Selection of a particular rotational orientation of shaft 10 relative to the locking position may be made by adjusting the position of stop gear 22 on carrier gear 20, e.g. by operation of setting knob 26. Spindle 28 to which knob 26 is fixed carries friction plate 30 which, in turn, supports stop gear 22 through bracket 32.

With gears 16, 18 and 20 of train 10 held stationary, rotation of knob 26 moves epicyclic gear 22 about the periphery of carrier gear 20 toward and away from locking space 24.

Shaft 10 is at all times free to rotate counterclockwise as viewed in FIG. 2 to any extent desired. Barrier pin 34 prevents stop gear 22 from entering space 36 between gears 18 and 20 whereby continued rotation of gear 20 causes gear 22 to merely rotate about its axis without affect upon counterclockwise rotation of shaft 10.

As illustrated in FIGS. 1 and 2, gear ratios are afforded which permit more than 360° (e.g. 376°) of shaft 10 counterclockwise rotation from the positions between locking of stop gear 22 in space 22 and its being stopped by barrier pin 34 without upsetting stop positions established by operational knob 26.

Stopping of shaft 10 at any part of the greater than 360° rotation can be accomplished and repeated with accuracy.

In FIG. 3, the modification of the invention eliminates idler gear 18 but is otherwise similar in construction and operation. Gear 16' being greater in diameter than gear 16 meshes directly with gear 20'. By proper selection of gear sizes 16' and 20' a desired greater than 360° counterclockwise rotation of shaft 10 without disturbing the stop setting of epicyclic gear 22 may be accomplished.

From the foregoing, it can be seen that there is provided a stress-free focusing stop for instrument focusing mechanisms with means for simply dialing desired stop positions Those skilled in the art will readily appreciate that there are various modifications and adaptations of the precise forms of the invention here shown and described that may suit particular requirements and, accordingly, the foregoing illustrations are not to be interpreted as restrictive of the invention beyond that necessitated by the following claims.

I claim:

1. An adjustable stop for an instrument focusing shaft comprising:
    a gear train including a first gear fixed to said shaft;
    an epicyclic stop gear;
    a carrier gear for said stop gear; and
    means for selectively independently adjusting said stop gear about the periphery of said carrier gear according to the extent of rotation desired of said shaft;
    whereby rotation of said carrier gear by rotation of said shaft in one direction carries said stop gear into mesh across said carrier gear and its adjoining gear at one side of said train to stop said shaft rotation.

2. An adjustable stop according to claim 1 including a barrier for preventing said stop gear from meshing across said carrier gear and its adjoining gear at the other side of said train whereby unlimited rotation of said shaft oppositely of said one direction is permitted.

3. An adjustable stop according to claims 1 or 2 including an idler gear between said gear fixed to said shaft and said carrier gear.

4. An adjustable stop according to claim 2 wherein gearing ratios of said train permit greater than 360° rotation of said shaft between travel of said stop gear from said position of mesh at said one side of said train to said position of engagement with said barrier means.

5. An adjustable stop according to claim 1 wherein said means for adjusting said stop gear includes a manually operable knob.

6. An adjustable stop according to claim 5 wherein said epicyclic stop gear is bracketed to a plate on said carrier gear, said plate making frictional engagement with said carrier gear and being rotatable by said knob for effecting said adjustment of said stop gear.

7. In an instrument system having a focusing mechanism including a focusing shaft, the improvement of an adjustable stop for said shaft comprising:
    a gear train including a first gear fixed to said shaft;
    an epicyclic stop gear;
    a carrier gear for said stop gear; and
    means for selectively independently adjusting said stop gear about the periphery of said carrier gear according to the extent of rotation desired of said shaft,
    whereby rotation of said carrier gear by rotation of said shaft in one direction carries said stop gear into mesh across said carrier gear and its adjoining gear at one side of said train to stop said shaft rotation.

8. The instrument system of claim 7 further including barrier means for preventing said stop gear from meshing across said carrier gear and its adjoining gear at the opposite side of said train whereby unlimited rotation of said shaft oppositely of said one direction is permitted.

* * * * *